(12) United States Patent
Lee

(10) Patent No.: US 11,507,796 B2
(45) Date of Patent: Nov. 22, 2022

(54) METHOD AND SYSTEM FOR SHARING AVATARS THROUGH INSTANT MESSAGING APPLICATION

(71) Applicant: LINE Plus Corporation, Seongnam-si (KR)

(72) Inventor: Yunji Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/135,141

(22) Filed: Dec. 28, 2020

(65) Prior Publication Data

US 2021/0211487 A1    Jul. 8, 2021

(30) Foreign Application Priority Data

Jan. 8, 2020  (KR) ........................ 10-2020-0002617

(51) Int. Cl.
| | | |
|---|---|---|
| *H04L 51/04* | (2022.01) | |
| *G06N 3/00* | (2006.01) | |
| *H04L 67/306* | (2022.01) | |
| *H04L 67/06* | (2022.01) | |
| *G06T 13/40* | (2011.01) | |

(52) U.S. Cl.
CPC ............ *G06N 3/006* (2013.01); *G06T 13/40* (2013.01); *H04L 51/04* (2013.01); *H04L 67/06* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 7,913,176 | B1 * | 3/2011 | Blattner | G06Q 10/107 |
| | | | | 715/758 |
| 10,169,897 | B1 * | 1/2019 | Geiger | G06F 3/0482 |
| 2008/0091692 | A1 * | 4/2008 | Keith | G06F 16/958 |
| 2009/0109228 | A1 * | 4/2009 | Shuster | G06F 3/04815 |
| | | | | 345/474 |
| 2009/0158170 | A1 * | 6/2009 | Narayanan | H04L 67/306 |
| | | | | 715/753 |
| 2009/0300525 | A1 * | 12/2009 | Jolliff | H04M 1/72451 |
| | | | | 715/764 |
| 2010/0115427 | A1 | 5/2010 | Schroeter et al. | |
| 2013/0088615 | A1 * | 4/2013 | Altieri | G06Q 30/08 |
| | | | | 348/231.3 |
| 2016/0042402 | A1 * | 2/2016 | Gadre | G06Q 30/0269 |
| | | | | 705/14.66 |
| 2020/0143456 | A1 * | 5/2020 | Gadre | G06Q 50/01 |

FOREIGN PATENT DOCUMENTS

| | | |
|---|---|---|
| KR | 10-2005-0009855 A | 1/2005 |
| KR | 10-2011-0138619 A | 12/2011 |
| KR | 10-2019-0108002 A | 9/2019 |
| KR | 10-2019-0137752 A | 12/2019 |

* cited by examiner

*Primary Examiner* — James A Edwards
(74) *Attorney, Agent, or Firm* — Sughrue Mion, PLLC

(57) ABSTRACT

A method for sharing avatars is provided, which includes: receiving, from a first user terminal, an avatar share request to share a first avatar including a first set of avatar components, with a second user terminal; creating a first temporary avatar by copying the first set of avatar components; associating the first temporary avatar with first link information; and transmitting the first link information to the second user terminal.

17 Claims, 12 Drawing Sheets

FIG. 5
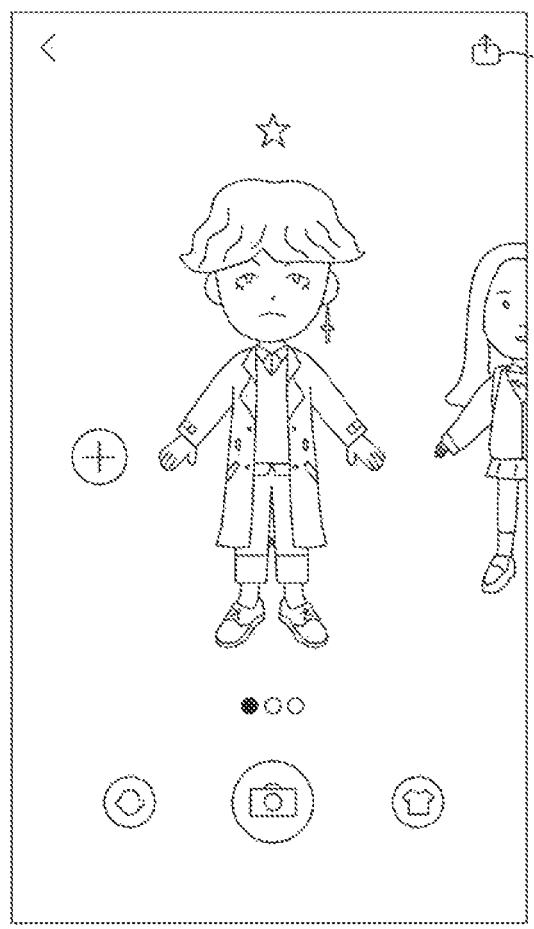
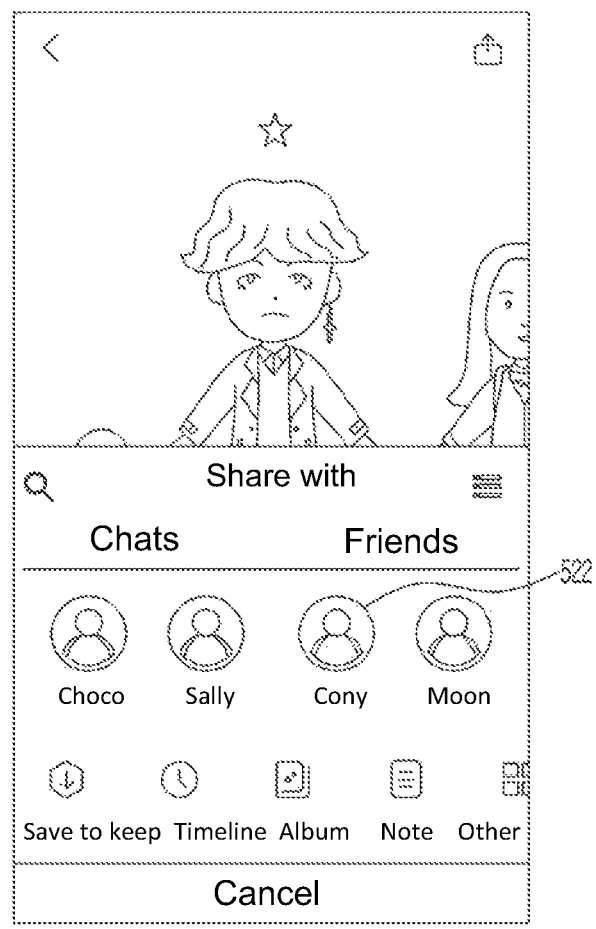

FIG. 6
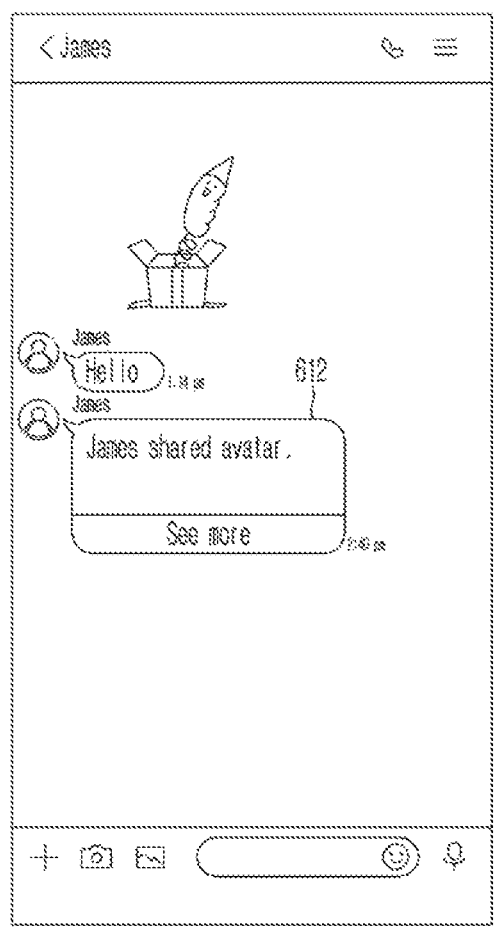
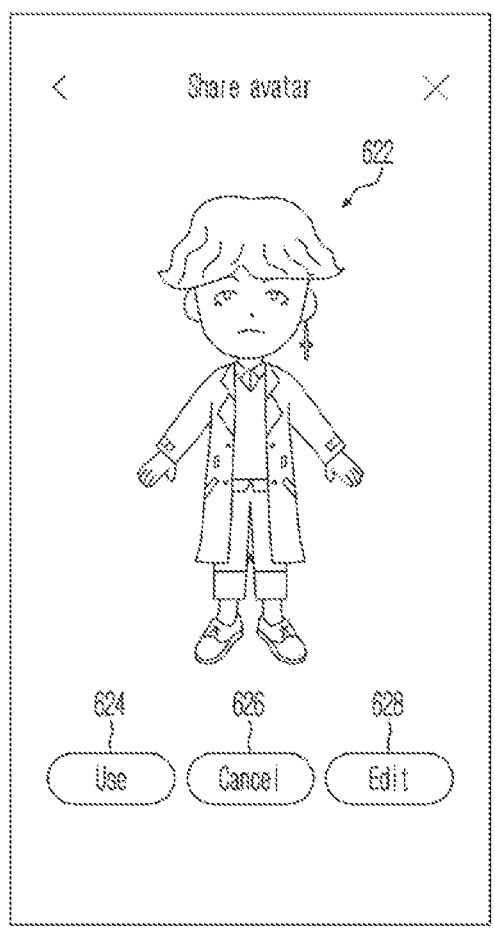

FIG. 7
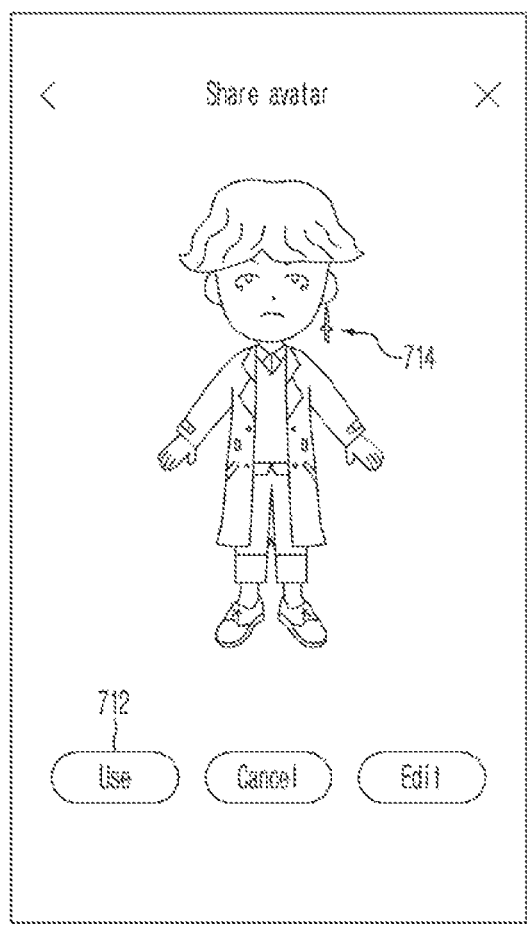
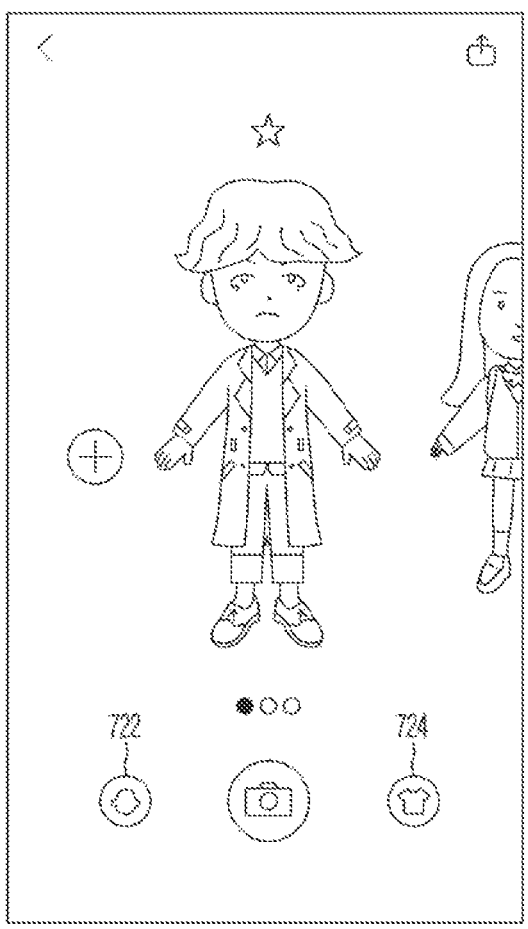

FIG. 8
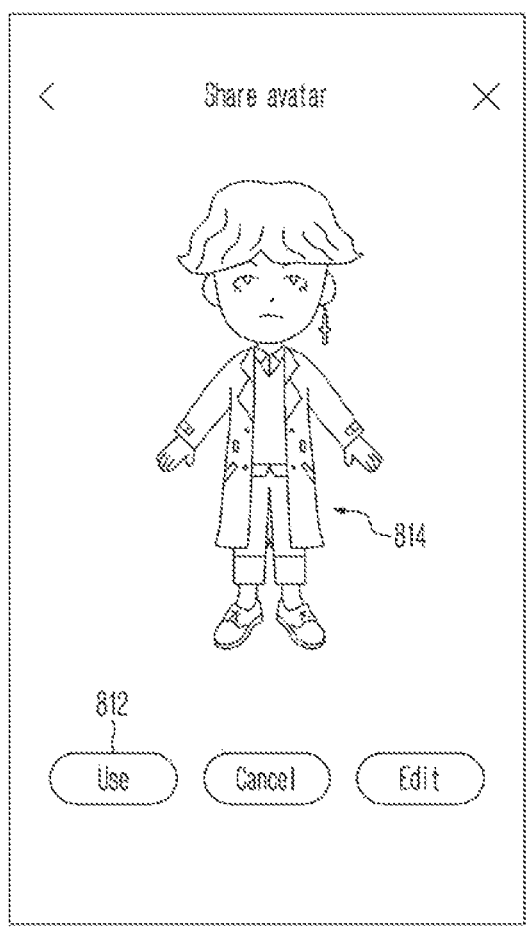
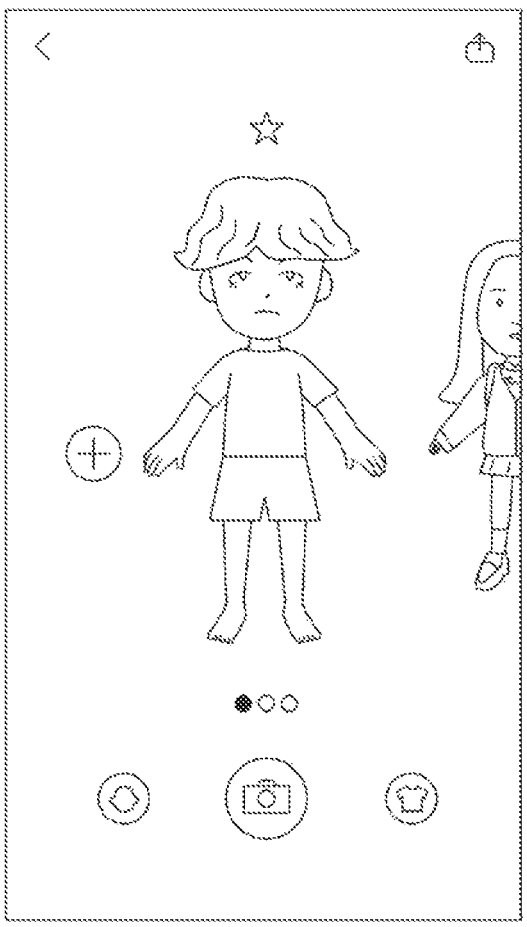

FIG. 9
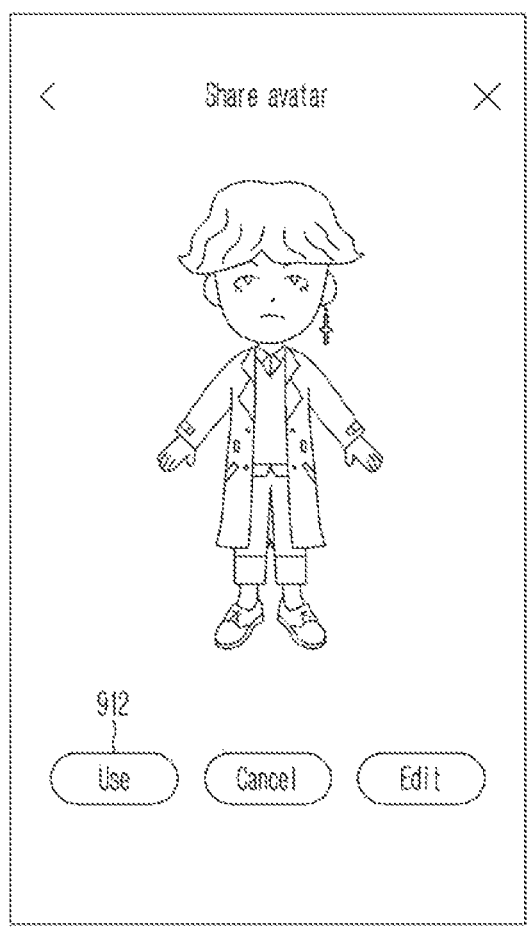
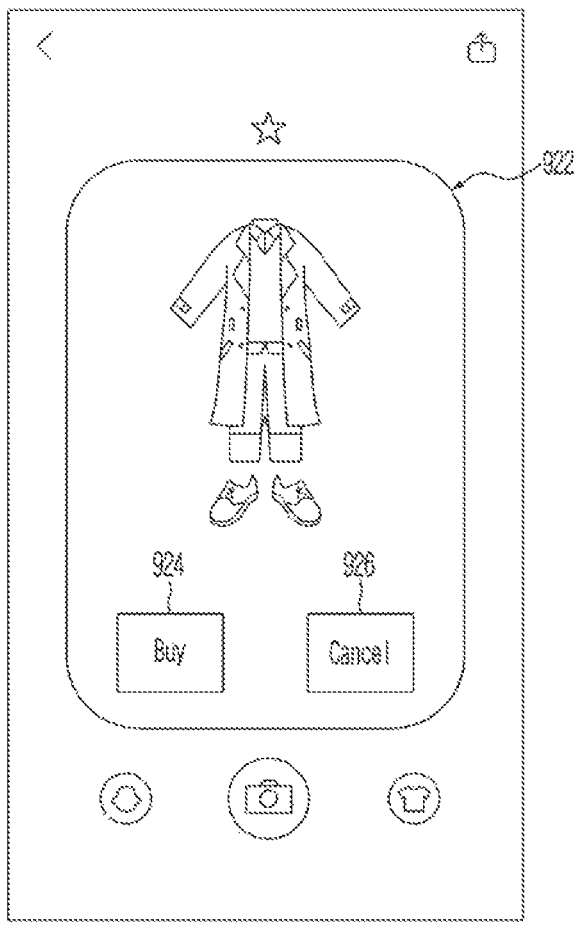

FIG. 10
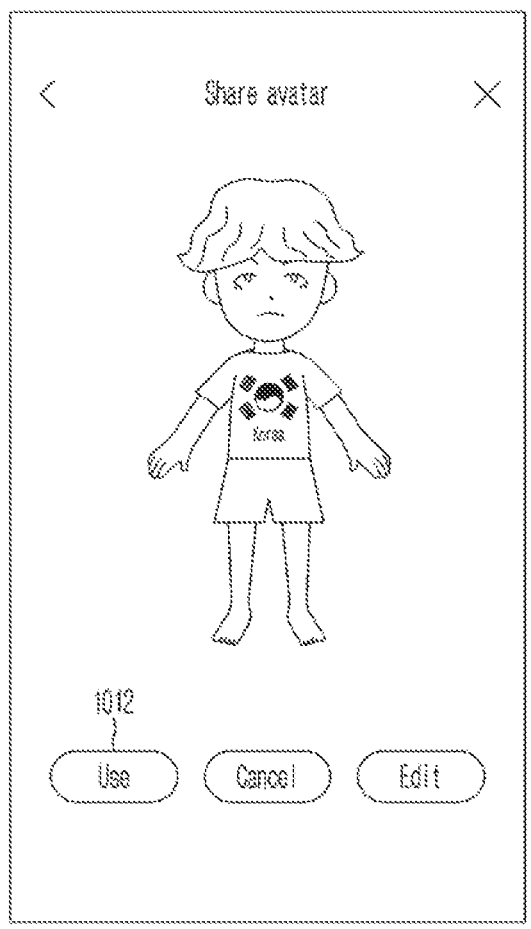
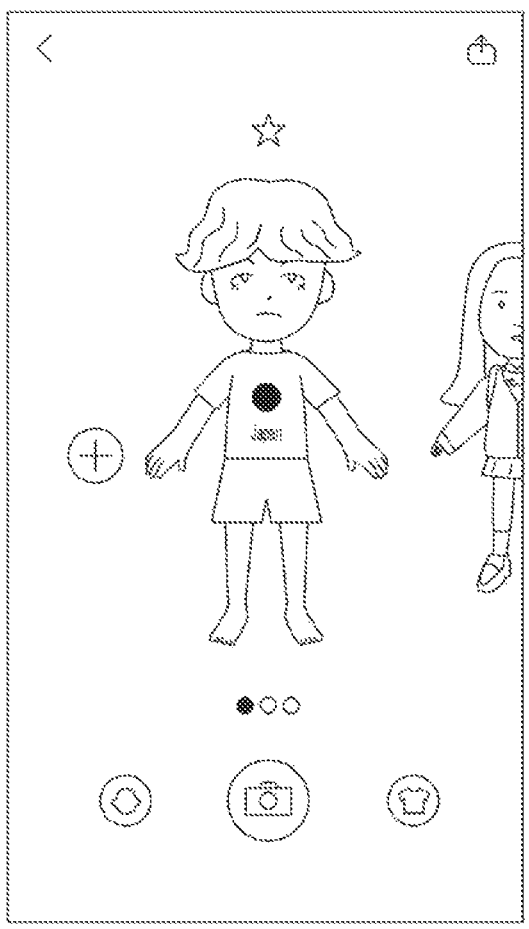

METHOD AND SYSTEM FOR SHARING AVATARS THROUGH INSTANT MESSAGING APPLICATION

CROSS-REFERENCE TO RELATED APPLICATION

This application claims priority under 35 U.S.C § 119 to Korean Patent Application No. 10-2020-0002617, filed on Jan. 8, 2020 in the Korean Intellectual Property Office, the disclosure of which is incorporated by reference herein in its entirety.

BACKGROUND

1. Field

Apparatuses and methods consistent with example embodiments relate to sharing avatars, and specifically, to sharing avatars through an instant messaging application.

2. Description of Related Art

There is a widespread distribution of client terminals with a built-in camera, such as smartphones, tablet PCs, laptop computers, desktop computers, and the like. In this environment, growing numbers of users utilize cameras that are built in terminals. For example, services are provided to allow a user of a terminal to take a photo of herself/himself by using a camera of the terminal, and to create an avatar from the photo, so that the user may use the avatar for her/his profile picture.

Although various services for creating avatars are provided, since the process of creating an avatar is a high-involvement task, there is a problem that a high learning-curve is required to use conventional avatar creation software or applications. In particular, when a user's understanding of a service or technology for creating an avatar is poor, it may be difficult to create a satisfactory avatar.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a method for sharing avatars, a system for sharing avatars, and a computer program stored in a non-transitory computer-readable recording medium storing instructions.

According to an aspect of an example embodiment, there is provided a method for sharing avatars, including: receiving, from a first user terminal, an avatar share request to share a first avatar comprising a first set of avatar components, with a second user terminal; creating a first temporary avatar by copying the first set of avatar components; associating the first temporary avatar with first link information; and transmitting the first link information to the second user terminal.

The method may further include: creating an image file of the first temporary avatar; and transmitting the image file of the first temporary avatar to the second user terminal.

the first user terminal may be associated with a first user account, the first avatar may be associated with the first user account, the second user terminal may be associated with a second user account, and the method may include: receiving a first use request to use the first temporary avatar from the second user terminal; and creating a second avatar associated with the second user account by copying the first set of avatar components of the first temporary avatar.

The method may further include: receiving, from the second user terminal, a modification request to modify the second avatar; and updating the first set of avatar components of the second avatar to a second set of avatar components based on the modification request.

The method may further include: transmitting the first link information to a third user terminal associated with a third user account; receiving a second use request to use an avatar from the third user terminal; and creating a third avatar associated with the third user account by copying the first set of avatar component of the first temporary avatar.

The method may further include: receiving a modification request to modify the third avatar from the third user terminal; and updating the first set of avatar components of the third avatar to a third set of avatar components based on the modification request, wherein the modification request to modify the third avatar may not affect the first and the second avatars.

The method may further include deleting the first temporary avatar after a predetermined time has elapsed since the first temporary avatar is created.

The avatar share request to share the first avatar may include sharing restriction information for the first avatar, and the first temporary avatar or the first link information may be associated with the sharing restriction information.

The method may further include: in response to determining that the first set of avatar components of the first temporary avatar comprises a charged item, creating the second avatar by removing the charged item from the first set of avatar components of the first temporary avatar.

The method may further include: in response to determining that the first set of avatar components of the first temporary avatar comprises a charged item, creating the second avatar by replacing the charged item from the first set of avatar components of the first temporary avatar with a corresponding free item.

The method may further include: in response to determining that the first set of avatar components of the first temporary avatar comprises a charged item, transmitting a message recommending purchase of the charged item to the second user terminal.

The creating the second avatar may include: in response to determining that a second country code of the second user account is different from a first country code of the first user account, creating the second avatar comprising a fourth set of avatar components in which at least one of the first set of avatar components of the first temporary avatar is replaced based on the second country code of the second user account.

The method may further include: receiving a use request to use an avatar from the second user terminal, wherein the use request comprises information about computer performance of the second user terminal; determining an availability of an avatar function in the second user terminal based on the information about the computer performance of the second user terminal; and in response to determining that the avatar function is not available in the second user terminal, transmitting an alarm message to the second user terminal.

The method may further include: receiving, from the first user terminal, an avatar item share request to share certain items of the first avatar; creating a second temporary avatar by copying a fifth set of avatar components related to the certain items of the first set of avatar components; associating the second temporary avatar with second link information; and transmitting the second link information to a fourth user terminal.

The fourth user terminal may be associated with a fourth user account, and the method may further include: receiving, from the fourth user terminal, an avatar item use request to use the certain items of the first avatar; and applying the fifth set of avatar components of the second temporary avatar to a fourth avatar associated with the fourth user account.

The avatar share request to share the first avatar may include item sharing restriction information for at least one item of the first avatar, and the first temporary avatar or the first link information may be associated with the sharing restriction information and the item sharing restriction information.

The first user terminal may be associated with a first user account, the first avatar may be associated with the first user account, the second user terminal may be associated with a second user account, and the method may further include: receiving, from the second user terminal, an avatar item use request to use certain items of the first temporary avatar; and associating a sixth set of avatar components corresponding to the certain items of the first temporary avatar with a second avatar associated with the second user account.

The method may further include: receiving an image from the first user terminal; and creating the first avatar comprising the first set of avatar components based on the image.

According to an aspect of another example embodiment, there is provided a non-transitory computer-readable storage medium storing a program that is executable by a computer to perform the method for sharing avatars.

According to an aspect of another example embodiment, there is provided a system for sharing avatars, including: a communication interface configured to receive, from a first user terminal, an avatar share request to share a first avatar comprising a first set of avatar components, with a second user terminal; a memory configured to store one or more computer readable instructions; and at least one processor configured to execute the computer readable instructions to: create a first temporary avatar by copying the first set of avatar components; associate the first temporary avatar with first link information; and transmit the first link information to the second user terminal through the communication interface.

BRIEF DESCRIPTION OF THE DRAWINGS

The above and/or other aspects will be more apparent by describing certain example embodiments, with reference to the accompanying drawings, in which:

FIG. 5 is a diagram illustrating an example in which a user shares an avatar according to an example embodiment;

FIG. 6 is a diagram illustrating an example in which a user checks a shared avatar according to an example embodiment;

FIG. 7 is a diagram illustrating an example in which a charged item is included in a shared avatar, where the avatar excluding the charged item is shared according to an example embodiment;

FIG. 8 is a diagram illustrating an example in which a charged item is included in a shared avatar, where the charged item is replaced with a basic item and the avatar is shared according to an example embodiment;

FIG. 9 is a diagram illustrating an example in which a charged item is included in a shared avatar, where a user is recommended to purchase the charged item according to an example embodiment;

FIG. 10 is a diagram illustrating an example in which a country code of a user sharing an avatar and a country code of a user receiving information on the shared avatar are different from each other, where the avatar is changed according to the country code according to an example embodiment;

DETAILED DESCRIPTION

Figure 1:
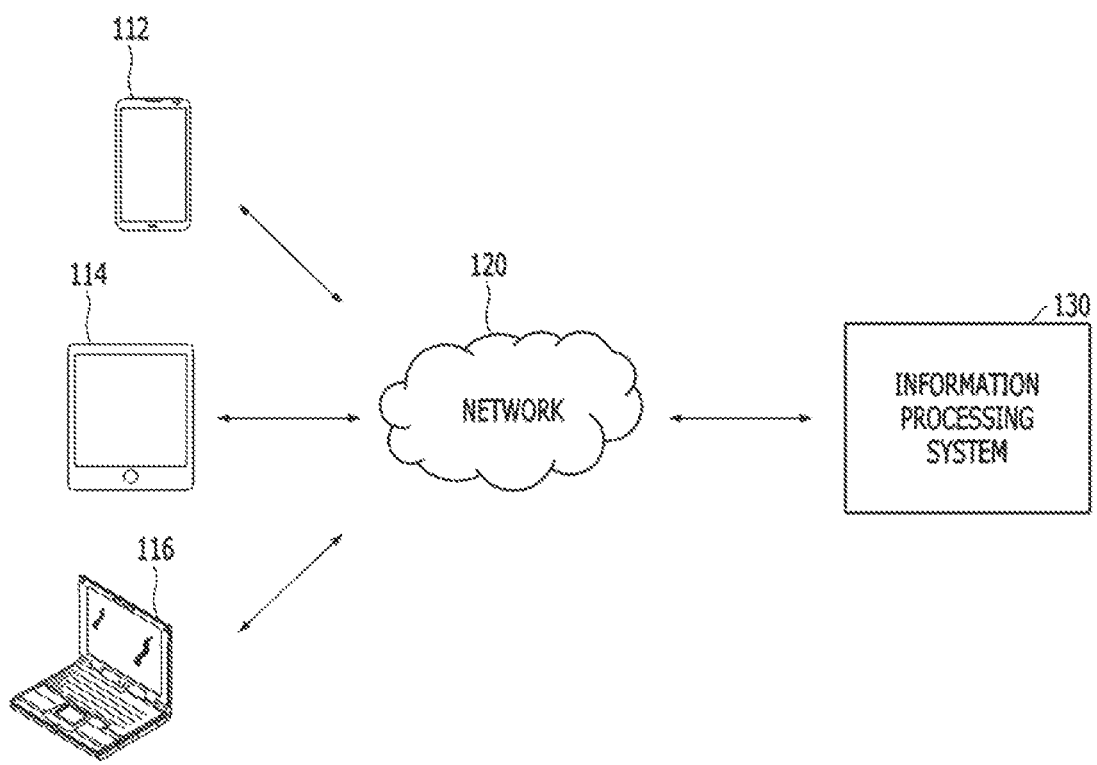
FIG. 1 is a schematic diagram showing a configuration in which an information processing system is communicatively connected to first to third user terminals in order to provide an avatar sharing service according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

As used herein, the singular forms 'a,' 'an,' and 'the' are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to execute at least one processor. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment of theresent disclosure, the "module" or "unit" may be implemented as a processor and a memory. A "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, a "chat room" may refer to a virtual space or group which may be generated in an instant messaging application installed on a computing device, and which may be participated by one or more users (or user accounts). For example, one or more user accounts may participate in or be included in the chat room and exchange various types of messages, files, and the like. In addition, in the chat room, Voice over Internet Protocol (VoIP) voice call function, VoIP video call function, and live broadcast function (VoIP real time video transmission function) are provided, enabling voice calls, video calls, video streaming, or the like to be performed between user accounts.

In the present disclosure, the "user account" may represent an account generated and used by a user in an instant messaging application or data related thereto. In addition, the user account of the instant messaging application may refer to a user who uses the instant messaging application. Likewise, a user who uses instant messaging or a chat room capable of instant messaging may refer to a user account of the instant application.

FIG. 1 is a schematic diagram illustrating a configuration in which an information processing system 130 is communicatively connected to first to third user terminals 112, 114, and 116 in order to provide an avatar sharing service according to an example embodiment. The information processing system 130 may include a server for providing an instant messaging service and a server for providing an avatar service to the first to third user terminals 112, 114, and 116 through a network 120. According to an embodiment, the information processing system 130 may include one or more server devices and/or databases, or one or more distributed computing devices and/or distributed databases based on cloud computing services. The information processing system 130 may store, provide and execute computer-executable programs (e.g., downloadable applications) and data related to the instant messaging service and the avatar service. The information processing system 130 may provide the instant messaging service to users through an instant messaging application installed in the first to third user terminals 112, 114, and 116. For example, the instant messaging service may include a text messaging service, a video call service, a voice call service, a video streaming service, an avatar sharing service, and the like between the first to third user terminals 112, 114, and 116.

In FIG. 1, a mobile phone terminal 112, a tablet terminal 114, and a PC terminal 116 are illustrated as examples of the user terminals, but the present disclosure is not limited thereto. The user terminal may be implemented as any computing device which is capable of wired and/or wireless communication, capturing an image through a built-in image sensor (e.g., a built-in camera) or receiving an image from an image sensor, and executing an instant messaging application installed thereon. Examples of the user terminal may include a smart phone, a mobile phone, a navigation system, a computer, a notebook computer, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, and the like. In addition, although FIG. 1 shows that three user terminals 112, 114, and 116 communicate with the information processing system 130 through the network 120, the embodiments are not limited thereto, and a different number of user terminals may be configured to communicate with the information processing system 130 through the network 120.

The method of communication is not limited, and may include a communication method using a communication network (e.g., mobile communication network, wired Internet, wireless Internet, broadcasting network, satellite network, and the like) that may be included in the network 120 as well as short-range wireless communication between user terminals. For example, the network 120 may include any one or more of networks including a personal area network (PAN), a local area network (LAN), a campus area network (CAN), a metropolitan area network (MAN), a wide area network (WAN), a broadband network (BBN), the Internet, and the like. In addition, the network 120 may include any one or more of network topologies including a bus network, a star network, a ring network, a mesh network, a star-bus network, a tree or hierarchical network, and the like, but not limited thereto.

The information processing system 130 may provide an avatar sharing service between user terminals 112, 114, and 116 on which the instant messaging application is running. In an embodiment, the user may use the instant messaging application running on the first user terminal 112 to transmit an avatar share request, which requests the information processing system 130 to share an avatar (e.g., an avatar associated with a user of the first user terminal 112 or an avatar stored on the first user terminal 112) with the second and third user terminals 114 and 116, to the information processing system 130 through the network 120. In an example, the avatar may be a character representing the user in a virtual environment, and include a plurality of avatar components. For example, the avatar component may include components for defining an appearance of the avatar (e.g., eye shape, nose shape, mouth shape, face shape, body shape, hair style, and the like), and components for defining items worn by the avatar (e.g., clothes, shoes, glasses, accessories, and the like).

When receiving the request to share an avatar from the first user terminal 112, the information processing system 130 may create a temporary avatar by copying the avatar of a first user account associated with the first user terminal 112. Additionally, the information processing system 130 may create an image file for the created temporary avatar. The information processing system 130 may associate the created temporary avatar with link information and transmit the link information to the second and third user terminals 114 and 116 through the instant messaging application. In an embodiment, the link information may be provided in the form of an action message on the instant messaging application including a user interface for checking the shared avatar and determining whether to use it or not.

When the user selects a corresponding link through a touch input or the like at the user terminals 114 and 116 that received the link information, the information processing system 130 may transmit the image file for the temporary avatar to the user terminals 114 and 116 through the instant messaging application. The user may check the image file for the temporary avatar displayed on the display of the user terminal and determine whether to use the shared avatar as his or her avatar. When the user determines to use the shared avatar, the user terminals 114 and 116 may transmit an avatar use request to use an avatar to the information processing system 130 through the instant messaging application.

When receiving the avatar use request from the user terminals 114 and 116, the information processing system 130 may create a new avatar by copying the temporary avatar, and associate the newly created avatar with the user accounts of the user terminals 114 and 116 such that an avatar of the corresponding user account may be created. The avatar shared with the second and third user terminals 114 and 116 from the first user terminal 112 exists independently from the avatar of the first user account. Accordingly, even when the avatar shared with the second user account associated with the second user terminal 114 is modified, the avatar of the first user account and the avatar of the third user account associated with the third user terminal 116 may not be affected. Likewise, even when the first user account modifies the avatar that is shared with other user terminals (e.g., the second and third user terminals 114 and 116), the avatar of the second user account and the avatar of the third user account may not be affected.

In an embodiment, the information processing system 130 may delete the temporary avatar created for sharing an avatar after a predetermined time elapses. For example, the information processing system 130 may be configured to delete the temporary avatar when two weeks elapse from the time when the temporary avatar is created. FIG. 1 illustrates that the first user terminal 112 shares an avatar with the second and third user terminals 114 and 116, but the present disclosure is not limited thereto. For example, the user may share an avatar with one user terminal or three or more user terminals.

As described above, by allowing a user-created avatar to be shared with other users, a user who is good at creating avatars may create avatars on behalf of other users and give the avatars as presents. By allowing the user to have someone else to create an avatar instead of himself or herself, diverse user experiences can be provided.

It has been described above that both the components for defining the appearance of the avatar (e.g., eye shape, nose shape, mouth shape, face shape, body shape, hair style, and the like) and the components for defining the fashion items worn by the avatar (e.g., clothes, shoes, glasses, accessories, and the like) are shared together, but the present disclosure is not limited thereto. For example, only the components defining the appearance of the avatar excluding the fashion items worn by the avatar may be shared. Alternatively, only the fashion items worn by the avatar excluding the components defining the appearance of the avatar may be shared. In this case, the user terminal may transmit a request to share the fashion item of the avatar to the information processing system 130 through the instant messaging application. Further, at least some of the components defining the appearance of the avatar or the components defining the fashion items worn by the avatar may be shared.

In response to receiving the request to share, the information processing system 130 may create a temporary avatar by copying the avatar components related to the fashion items from among the avatar components of the avatar to be shared. Thereafter, the information processing system 130 may associate the created temporary avatar with the link information and transmit the link information to the user terminal which is the user terminal to share the fashion item with. When receiving the request to use the fashion items from the user terminal that received the link information, the information processing system 130 may apply the shared fashion items to the avatar of the user.

Figure 2:
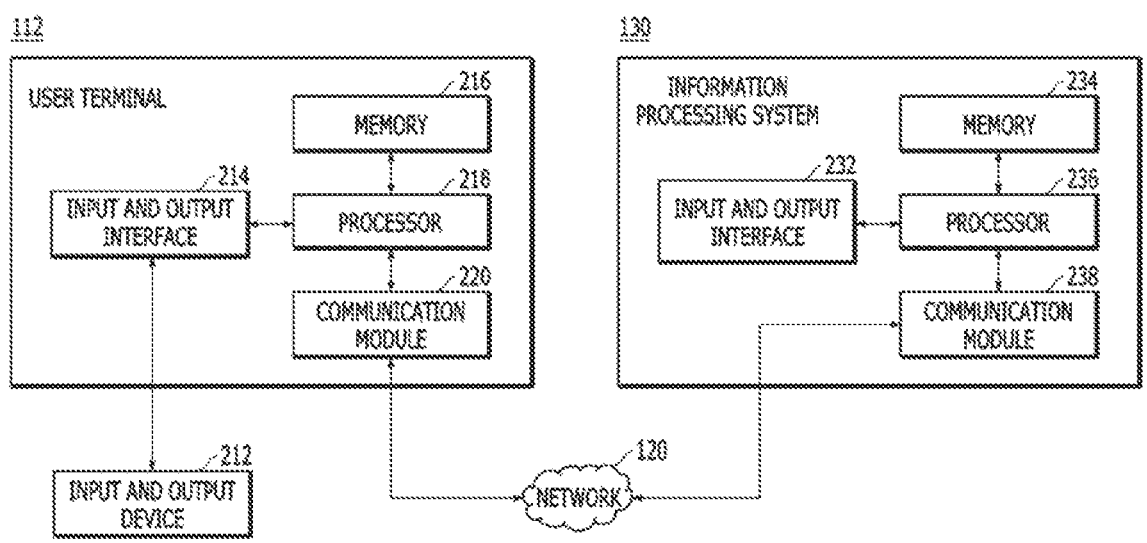
FIG. 2 is a block diagram illustrating an internal configuration of a user terminal and an information processing system according to an example embodiment.

FIG. 2 is a block diagram illustrating an internal configuration of the user terminal 112 and the information processing system 130 according to an example embodiment. The user terminal 112 may include a memory 216, a processor 218, a communication module (e.g., a communication interface) 220, and an input and output interface 214. Likewise, the information processing system 130 may include a memory 234, a processor 236, a communication module (e.g., a communication interface) 238, and an input and output interface 232. As shown in FIG. 2, the user terminal 112 and the information processing system 130 may be configured to communicate information and/or data through the network 120 using the respective communication modules 220 and 238. In addition, the input and output device 212 may be configured to input information and/or data to the user terminal 112 or to output information and/or data generated from the user terminal 112 through the input and output interface 214. In FIG. 2, while the memory 216, the processor 218, the communication module 220, and the input and output interface 214 are shown as the internal configuration of the user terminal 112, other user terminals (e.g., the user terminals 114 and 116 of FIG. 1) may also include the internal configuration identical or similar to the internal configuration of the user terminal 112.

The memories 216 and 234 may include any non-transitory computer-readable recording medium. According to an embodiment, the memories 216 and 234 may include a permanent mass storage device such as random access memory (RAM), read only memory (ROM), disk drive, solid state drive (SSD), flash memory, and the like. As another example, the permanent mass storage device such as ROM, SSD, flash memory, disk drive, and the like is a separate permanent storage device that is distinguished from the memories 216 and 234 and may be included in the user terminal 112 or the information processing system 130. In addition, the memories 216 and 234 may store an operating system and at least one program code (e.g., a code for a browser installed and driven in the user terminal 112 or a dedicated application installed on the user terminal 112 to provide an instant messaging service and an avatar service).

These software components may be loaded from a computer-readable recording medium separate from the memories 216 and 234. Such a separate computer-readable recording medium may include a recording medium directly connectable to the user terminal 112 and the information processing system 130, and may include a computer-readable recording medium such as a floppy drive, a disk, a tape, a DVD/CD-ROM drive, a memory card, and the like, for example. As another example, the software components may be loaded into the memories 216 and 234 through the communication modules 220 and 238 rather than the computer-readable recording medium. For example, at least one program may be loaded into the memories 216 and 234 based on a computer program (e.g., the application dedicated to the instant messaging service described above) installed by files provided by developers or a file distribution system for distributing an installation file of an application through the network 120.

The processors 218 and 236 may be configured to process an instruction of a computer program by performing basic arithmetic, logic, and input and output operations. The instruction may be provided to the processors 218 and 236 from the memories 216 and 234 or the communication modules 220 and 238. For example, the processors 218 and 236 may be configured to execute the received instruction according to program code stored in a recording device such as memories 216 and 234.

The communication modules 220 and 238 may provide a configuration or a function for the user terminal 112 and the information processing system 130 to communicate with each other through the network 120, and may provide a configuration or a function for the user terminal 112 and/or the information processing system 130 to communicate with another user terminal or another system (e.g., a separate push notification server, and the like). For example, a request (e.g., a request to share an avatar) generated by the processor 218 of the user terminal 112 according to the program code stored in the recording device such as the memory 216 may be transmitted to the information processing system 130 through the network 120 under the control of the communication module 220. Conversely, control signals or instructions provided under the control of the processor 236 of the information processing system 130 may be received by the user terminal 112 through the communication module 220 of the user terminal 112 via the communication module 238 and the network 120. For example, the user terminal 112 may receive information related to the shared avatar from the information processing system 130 through the communication module 220.

The input and output interface 214 may be a means for interfacing with the input and output device 212. Examples of the input device may include a camera, a keyboard, a microphone, and a mouse, and examples of the output device may include a display, a speaker, a haptic feedback device, and the like. As another example, the input and output interface 214 may be a means for interfacing with a device such as a touch screen or the like that integrates a configuration or a function for performing inputting and outputting. For example, when the processor 218 of the user terminal 112 processes the instruction of the computer program loaded in the memory 216, a service screen or content configured using the information and/or data provided by the information processing system 130 or other user terminals may be displayed on the display through the input and output interface 214. The input and output device 212 may be configured as one device with the user terminal 112. In addition, the input and output interface 232 of the information processing system 130 may be a means for interface with a device for inputting or outputting that may be connected to, or included in the information processing system 130. In FIG. 2, the input and output interfaces 214 and 232 are illustrated as the components configured separately from the processors 218 and 236, but are not limited thereto, and the input and output interfaces 214 and 232 may be configured to be included in the processors 218 and 236.

The user terminal 112 and the information processing system 130 may include more than those components shown in FIG. 2. Meanwhile, it would be unnecessary to exactly illustrate most of the related components. According to an embodiment, the user terminal 112 may be implemented to include at least some of the input and output devices described above. In addition, the user terminal 112 may further include other components such as a transceiver, a global positioning system (GPS) module, a camera, a microphone, various sensors, a database, and the like. For example, when the user terminal 112 is a smartphone, it may generally include components included in the smartphone, and for example, it may be implemented such that various components such as an acceleration sensor or a gyro sensor, a camera module, a microphone module, various physical buttons, buttons using a touch panel, input/output ports, a vibrator for vibration, and the like are further included in the user terminal 112.

According to an embodiment, the processor 218 of the user terminal 112 may be configured to operate the instant messaging application or the web browser application that provides the avatar sharing service. In this case, the program code associated with the application may be loaded into the memory 216 of the user terminal 112. While the application is running, the processor 218 of the user terminal 112 may receive information and/or data provided from the input and output device 212 through the input and output interface 214 or receive information and/or data from the information processing system 130 through the communication module 220, and process the received information and/or data and store it in the memory 216. In addition, such information and/or data may be provided to the information processing system 130 through the communication module 220.

According to an embodiment, while the instant messaging application is running, the processor 218 may receive texts, images, sounds, and so on, which may be input or selected through the input device such as a touch screen, a keyboard, or the like connected to the input and output interface 214, and store the received texts, images, sounds, and so on in the memory 216 or provide them to the information processing system 130 through the communication module 220 and the network 120. For example, the processor 218 may receive information for generating a request to create an avatar, a request to share an avatar, and the like, through an input device such as a touch screen, a keyboard, and the like. Accordingly, the received texts, images, sounds, and so on may be provided to the information processing system 130 through the communication module 220 and the network 120.

The processor 218 may be configured to output the processed information and/or data through an output device such as a device capable of outputting a display (e.g., touch screens, displays, and the like) of the user terminal 112 or a device capable of outputting an audio (e.g., a speaker). According to an embodiment, information and/or data provided by the instant messaging application or the web browser application may be displayed through the device capable of outputting a display, or the like. According to another embodiment, information and/or data provided by the instant messaging application or the web browser application may be output through the device capable of outputting an audio, or the like.

According to an embodiment, the processor 236 of the information processing system 130 may be configured to manage, process, and/or store the information and/or data received from a plurality of user terminals including the user terminal 112 and/or a plurality of external systems. For example, the processor 236 may create an avatar based on the request to create an avatar received from a plurality of user terminals. As another example, the processor 236 may be configured to share the selected avatar with the other user terminals in response to the request to share an avatar transmitted from the user terminal 112. Hereinafter, a detailed description will be given of a specific method of the processor 236 of the information processing system 130 for providing the avatar sharing service based on the request to share an avatar.

Figure 3:
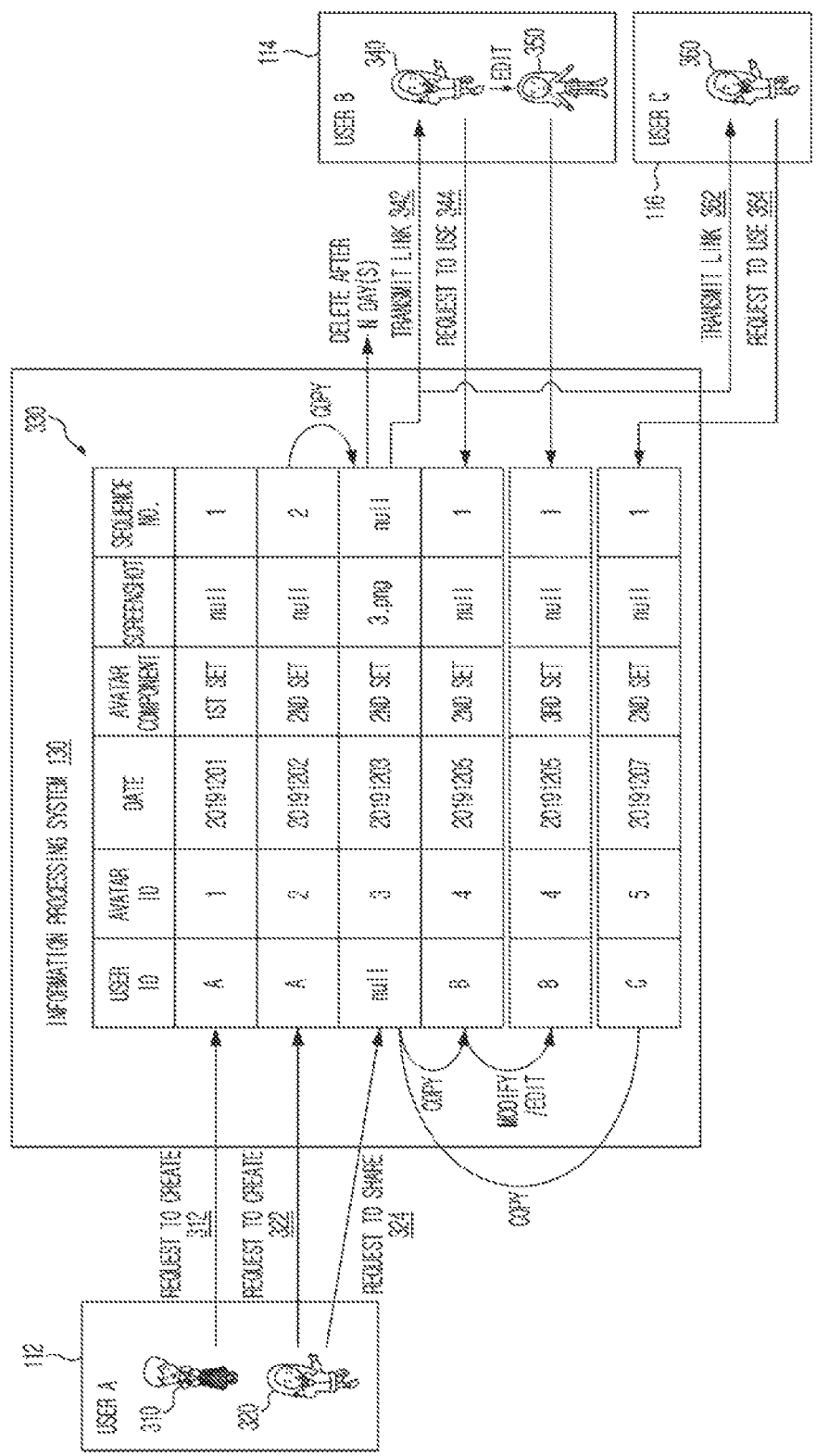
FIG. 3 is a diagram illustrating an example method of providing an avatar sharing service between a user terminal and an information processing system according to an example embodiment.

FIG. 3 is a diagram illustrating an example method of providing an avatar sharing service between a plurality of user terminals (e.g., a first user terminal 112, a second user terminal 114, and a third user terminal 116) the information processing system 130 according to an example embodiment. As shown in FIG. 3, the information processing system 130 may include a database 330 in which information on avatars for each user is stored. In an embodiment, the information processing system 130 may receive, from the first user terminal 112 of user A, a first avatar creation request 312 that requests creation of a first avatar 310. In an example, in response to the first avatar creation request 312, the information processing system 130 may create the first avatar 310 through the instant messaging application running in the first user terminal 112 associated with the user A.

In an embodiment, the first avatar creation request 312 may include information on the user account that creates the first avatar creation request 312 (e.g., user A), and information on components (e.g., components defining the appearance of the first avatar 310, and the components defining the fashion items worn by the first avatar 310) of the first avatar 310, and the like. In response to receiving the first avatar creation request 312, the information processing system 130 may store a first set of avatar components configuring the first avatar 310 in the database 330. In addition, the information processing system 130 may assign an avatar ID, a creation date, and a sequence number of the first avatar 310 as "1", "20191201", and "1", respectively, and associate the stored first avatar 310 with the user A in the database 330.

Likewise, when receiving a second avatar creation request 322 that requests a creation of a second avatar 320, from the first user terminal 112 of the user A, the information processing system 130 may store a second set of avatar components forming the second avatar 320 in the database 330. In addition, the information processing system 130 assigns the user ID, the avatar ID, the creation date, and the sequence number of the second avatar 320 as "A", "2", "20191202", and "2", respectively, to store the second avatar 320 of the user A in the database 330. The sequence number item of the database 330 indicates the order in which avatars are displayed on the avatar of a user management screen when the user A owns a plurality of avatars. That is, since the avatar ID "1" associated with the user A has the sequence number "1" and the avatar ID "2" has the sequence number "2", on the avatar management screen of the user A, the avatars owned by the user A may be displayed on the screen in the order of avatar ID "1" and avatar ID "2".

In an embodiment, the user A may share the second avatar 320 owned by the user A with the user B and the user C. In this case, the first user terminal 112 of the user A may transmit an avatar share request 324 to the information processing system 130 through the instant messaging application. For example, the avatar share request 324 may include information on the user account that creates the avatar share request 324 (e.g., user A), information on the avatar to be shared (e.g., avatar ID "2"), and information on the user account to share the avatar with (e.g., user B and user C), and the like.

In response to receiving the avatar share request 324, the information processing system 130 may create a temporary avatar for sharing by copying the avatar components (e.g., the second set of avatar components) of the avatar to be shared (e.g., avatar ID "2"). In particular, the information processing system 130 may assign a new avatar ID (e.g., avatar ID "3") to the temporary avatar for sharing, and store the date when the temporary avatar for sharing is created (e.g., 20191203 or 12/3/2019) in the database 330. In addition, the information processing system 130 may create an image file (e.g., "3.png") of the temporary avatar for sharing and store the image file in the database 330. In an embodiment, the information processing system 130 may also store, in the database 330, information on user accounts which are allowed to receive shared avatars (e.g., user B and user C).

After creating the temporary avatar for sharing, the information processing system 130 may associate the temporary avatar with first link information 342 and second link information 362, and then transmit the first link information 342 to the second user terminal 114 of the user B, and transmit the second link information 362 to the third user terminal 116 of the user C at 362. The first link information 342 and the second link information 362 may contain a link to download the temporary avatar. The first link information 342 and the second link information 362 may include the same link, or different links. In an embodiment, the information processing system 130 may create link information containing the avatar ID (e.g., avatar ID "3") of the temporary avatar for sharing, and transmit the created link to the second user terminal 114 of the user B and the third user terminal 116 of the user C through the instant messaging application. For example, the link information may be Uniform Resource Locator (URL) information.

When the second user terminal 114 of the user B receives the link information, the related information may be provided to the user B in the form of an action message on the instant messaging application. When the user B selects the action message displayed on the screen by a touch input or the like, a user interface for checking the shared avatar and determining whether or not to use the shared avatar may be displayed on the screen. For example, the information processing system 130 may transmit the image file (e.g., "3.png") for the temporary avatar for sharing to the second user terminal 114 associated with the user B, and the image file may be displayed on the screen of the second user terminal 114.

When the user B makes a request to use the shared avatar through the second user terminal 114, the second user terminal 114 may transmit a first avatar use request 344 to the information processing system 130 through the instant messaging application. In this case, the information processing system 130 may create a third avatar 340 by copying a second set of avatar components configuring the temporary avatar for sharing (e.g., avatar ID "3"). In addition, the information processing system 130 may assign the avatar ID, the creation date, and the sequence number of the third avatar 340 as "4", "20191205", and "1", respectively, and associate the third avatar 340 with the user B such that the third avatar 340 may be stored as the first avatar of the user B in the database 330.

In an embodiment, the second user terminal 114 of the user B may modify and edit the third avatar 340 owned by the user B. In this case, the information processing system 130 may receive a modification request to modify the third avatar 340, from the second user terminal 114 associated with user B through the instant messaging application, and update the second set of avatar components of the third avatar 340 to a third set of avatar components based on the modification request and store the result as a fourth avatar 350. In an embodiment, the information processing system 130 may add information on the fourth avatar 350 after the modification to the database 330, and delete the information on the third avatar 340 before the modification from the database 330. As shown, the avatar (avatar ID "4") shared with the user B by the user A is stored in the database 330 independently of the avatar (avatar ID "2") shared by the user A, such that even when the user B modifies the avatar (avatar ID "4") shared by the user A, it does not affect the avatar (avatar ID "2") of the user A.

Likewise, when the third user terminal 116 of the user C makes a request to use the shared avatar, the third user terminal 116 may transmit a second avatar use request 364 to the information processing system 130 through the instant messaging application. In this case, the information processing system 130 may create a fifth avatar 360 by copying the second set of avatar components configuring the temporary avatar (e.g., avatar ID "3") for sharing and assigning a new avatar ID (e.g., avatar ID "5") thereto. In addition, the information processing system 130 may assign the creation date and the sequence number of the fifth avatar 360 as "20191207" and "1", respectively, and associate the fifth avatar 360 with the user C such that the fifth avatar 360 may be stored as the first avatar of the user C in the database 330.

In an embodiment, the information processing system 130 may delete the temporary avatar for sharing created for the purpose of sharing the avatar after a predetermined time elapses. For example, the information processing system 130 may be configured to delete the temporary avatar (e.g., avatar ID "3") when two weeks elapse (e.g., on Dec. 17, 2019) from the time (e.g., from Dec. 3, 2019) when the temporary avatar (avatar ID "3") is created.

Figure 4:
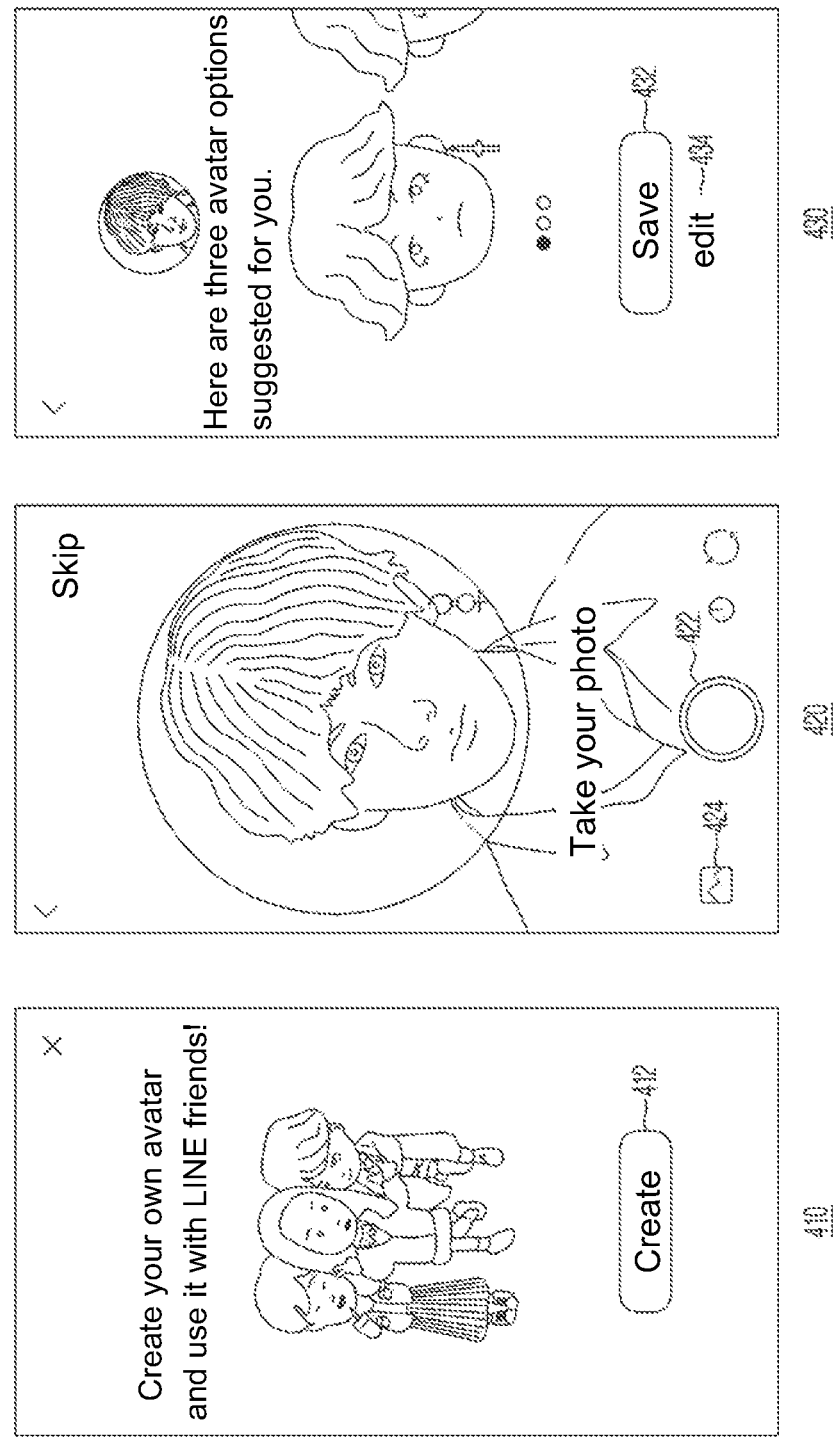
FIG. 4 is a diagram illustrating an example in which a user creates an avatar according to an example embodiment.

FIG. 4 is a diagram illustrating an example in which a user creates an avatar according to an example embodiment. The user may create an avatar through the first, second and third operations 410, 420, and 430. The first operation 410 indicates that the user selects the "Create" button 412 through a touch input or the like in order to create an avatar. The second operation 420 indicates that the camera of the user terminal is activated in response to the user selecting the "Create" button 412. As illustrated, when the camera of the user terminal is activated, an image captured through the camera may be displayed on the display of the user terminal in real time.

When the user taps a shutter button 422 through a touch input or the like, the camera of the user terminal may capture the image of the user and create the avatar of the user based on the captured image. Alternatively, when the user taps a photo gallery button 424 through a touch input or the like, the user terminal may create the avatar of the user based on an image previously photographed or an image stored in the user terminal. In an embodiment, the user terminal may transmit the captured image or the stored image to the information processing system through the instant messaging application, and the information processing system may create the avatar of the user based on the received image. In this case, the information processing system may transmit information related to the created avatar to the user terminal.

The third operation 430 indicates that the avatar automatically created based on the image is displayed on the display of the user terminal. As illustrated, a plurality of avatars may be created based on the image selected by the user and provided to the user. In this case, the user taps a "Save" button 432 through a touch input or the like to store one of the suggested avatars and use it as his or her avatar. Alternatively, the user may tap an "Edit" button 434 through a touch input or the like to edit one of the suggested avatars and then store and use the result as his or her avatar.

An avatar creation application or software according to an example embodiment may be provided separately from an instant messaging application but operates in conjunction with the avatar creation application, or may be provided as software embedded in the instant messaging application, so that a user may use avatar creation and share features on the instant messaging application.

For example, as shown in FIG. 4, a first user terminal 112 may execute the avatar creation application and may display the "Create" button 412 on a display screen of the first user terminal 112, in operation 410. The first user terminal 112 may turn on the camera of the first user terminal 112, may display a field of view of the camera on the display screen of the first user terminal 112, and may prompt a user of the first user terminal 112 to press the shutter button 422, in operation 420. The first user terminal 112 may also allow the user to skip taking a photo and instead, to press the photo gallery button 424 to use photos that are stored in the first user terminal 112, in creating an avatar. In operation 430, the first user terminal 112 (or a server that interacts with the first user terminal 112) may create one or more avatars based on the photo obtained in operation 420, and may display the created avatars on the display screens. Also, the first user terminal 112 may display the "Save" button 432 and the "Edit" button 434 to allow the user to save the created avatars as provided, or to edit the created avatars.

FIG. 5 is a diagram illustrating an example in which the user shares the avatar according to an example embodiment. The user may share the avatar with other users through a first operation 510 and a second operation 520. The first operation 510 indicates that the user selects a share button 512 on the avatar management screen through a touch input or the like to start sharing the avatar owned by the user.

The second operation 520 indicates that the user selects a user to share the avatar with. For example, the user may select a chat room 522 with "Cony" from a list of currently created chat rooms through a touch input or the like, and share the selected avatar with "Cony". In this case, the link information associated with the shared avatar may be provided as a message (e.g., a message in the form of an action message) in a 1:1 chat room with "Cony".

In an example embodiment, the first user terminal 112 may display an avatar and the share button 512 in operation 510. In operation 520, when the first user terminal 112 recognizes that the share button 512 is pressed, the first user terminal 112 may display a list of friends or a list of created chat rooms so that the user may select one of the friends (e.g., "Cony") or one of the created chat rooms (e.g., the chat room 522 in which "Cony" participates) as a person or a chat room to share the avatar with.

FIG. 6 is a diagram illustrating an example in which the user checks a shared avatar according to an example embodiment. The user may check the avatar shared by other users through a first operation 610 and a second operation 620. The first operation 610 indicates that the user (e.g., Cony) of the first user terminal 112 receives information on the avatar shared by James (e.g., an avatar shared by the second user terminal 114) through a 1:1 chat room through the instant messaging application that is installed on the first user terminal 112. As illustrated, the avatar shared by other users may be received in the form of an action message 612, and the action message 612 may be displayed on the display of the user terminal with a message "James shared avatar."

The second operation 620 indicates that the user checks the shared avatar in response to selecting the action message 612 through a touch input or the like, and that the user interface for determining whether to use the shared avatar is displayed on the display of the first user terminal 112. As illustrated, an image 622 of the shared avatar may be displayed on the screen together with a use button 624, a cancel (or decline) button 626, and an edit button 628. In an embodiment, the first user terminal 112 may allow the user to select the use button 624 through a touch input or the like to use the shared avatar as his or her avatar. Also, the first user terminal 112 may allow the user to select the cancel (or decline) button 626 through a touch input or the like so as not to use the shared avatar as his or her avatar. Further, the user may select the edit button 628 through a touch input or the like to edit and modify the shared avatar.

FIG. 6 illustrates that the user can check the image 622 of the shared avatar by selecting the action message 612 in the chat room, but the present disclosure is not limited thereto. For example, the action message 612 may be displayed together with the image 622 of the shared avatar and the message "James shared avatar." In this case, the user can immediately check the image 622 of the shared avatar even without selecting the action message 612.

FIG. 7 is a diagram illustrating an example in which a charged item is included in the shared avatar, where the avatar excluding the charged item is shared according to an example embodiment. The user may use the shared avatar through first and second operations 710 and 720. The first operation 710 indicates that the user selects a use button 712 through a touch input or the like to use the shared avatar as his or her avatar. In an embodiment, the shared avatar may include a charged item such as an earring 714, for example.

The second operation 720 indicates that the avatar of the user is set based on the shared avatar in response to the user selecting the use button 712. In this case, the earring 714, which is a charged or paid item, may be excluded from the set avatar of the user. In an embodiment, the user selects a first edit button 722 to edit the components for defining the appearance of the avatar (eye shape, nose shape, mouth shape, face shape, body shape, hair style, and the like). Additionally, the user may select a second edit button 724 to edit the components for defining the fashion item worn by the avatar.

FIG. 8 is a diagram illustrating an example in which a charged or paid item is included in a shared avatar, where the charged item is replaced with a basic item and the avatar is shared according to an example embodiment. The user may use the shared avatar through first and second operations 810 and 820. The first operation 810 indicates that the user selects a use button 812 through a touch input or the like to use the shared avatar as his or her avatar. In an embodiment, the shared avatar may include a charged item 814 such as earrings, clothes, shoes, and the like, for example.

The second operation 820 indicates that the avatar of the user is set based on the shared avatar in response to the user selecting the use button 812. In this case, the charged item included in the shared avatar may be replaced with a corresponding free item (e.g., basic short sleeves, basic shorts) and then stored as an avatar of the user. The image processing system 130 may store a mapping table or a look-up table in which a plurality of free times that are mapped to a plurality of charged/paid items. FIGS. 7 and 8 illustrate that the charged item is removed or the charged item is replaced with a corresponding free item after the user selects the use button, but the present disclosure is not limited thereto. For example, when the charged item is included in the shared avatar, an avatar removed of the charged item or an avatar with a corresponding free item instead of the charged item may be displayed on a screen for the user to determine whether or not to use the avatar.

FIG. 9 is a diagram illustrating an example in which a charged item is included in the shared avatar, where the user is recommended to purchase the charged item according to an example embodiment. The user may use the shared avatar through first and second operations 910 and 920. The first operation 910 indicates that the user selects a use button 912 through a touch input or the like to use the shared avatar as his or her avatar. In an embodiment, the avatar shared with the user may include charged items such as clothes and shoes.

The second operation 920 indicates an example in which a message 922 recommending purchase of the charged item included in the avatar shared with the user is displayed on the screen. The purchase recommendation message 922 may include an image of the charged item, a buy button 924 and a cancel button 926. In an embodiment, the user may select the buy button 924 through a touch input or the like to purchase the charged item included in the shared avatar. Alternatively, the user may select the cancel button 926 through a touch input or the like to use the avatar excluding the charged item included in the shared avatar.

In an another example, the first user terminal 112 may allow the user to selectively pick and choose each of the graphic items or objects (e.g., a human body, a jacket, pants, a shirt, a vest, and an earring) that form the avatar in the first operation 910, and may allow the user to obtain the selected graphic items for free or with a payment in the second operation 920. In the first operation 910, the user may tap the graphic items or objects (e.g., the human body, the jacket, the pants, the shirt, the vest, and the earring) to select the graphic items or objects.

FIG. 10 is a diagram illustrating an example in which a country code of the user sharing the avatar and a country code of the user receiving information on the shared avatar are different from each other, where the avatar is changed according to the country code according to an example embodiment. The user may use the shared avatar through first and second operations 1010 and 1020. The first operation 1010 indicates that the user selects a use button 1012 through a touch input or the like to use the shared avatar as his or her avatar. In an embodiment, the avatar shared with the user may include an item associated with a specific country code (Korea code), such as a T-shirt printed with a Korean flag and text "Korea".

The second operation 1020 indicates that the avatar of the user is set based on the shared avatar in response to the user selecting the use button 1012. In this case, when the country code (e.g., Japan) of the user who receives the information on the shared avatar and the country code (e.g., Korea) of the user who shared the avatar are different from each other, the item associated with the country code may be changed based on the country code (e.g., Japan) of the user who receives the information on the shared avatar. For example, a T-shirt printed with the Korean flag and text "Korea" may be changed to a T-shirt printed with the Japanese flag and text "Japan".

In order to perform the first operation 1010 and the second operation 1020 by the first user terminal 112 which receives a shared avatar from the second user terminal 114, the first user terminal 112 may receive a country code (hereinafter "a first country code") of a user account associated with the second user terminal 114, along with the shared avatar. The country code may be included in the same data packet where the shared avatar is contained, or may be transmitted through a separate packet. The country code may be assigned to the shared avatar itself. The first user terminal 112 may determine whether the first country code of the user account associated with the second user terminal 114 (or the first country code of the shared avatar) is different from a country code (hereinafter "a second country code") of a user account associated with the first user terminal 112. If the first user terminal 112 determines that the first country code is different from the second country code, the first user terminal 112 may modify the shared avatar based on the second country code. In an another example embodiment, the information processing system 130 may determine whether the first country code is different from the second country code, and may modify the shared avatar based on the second country code if the first country code is different from the second country code.

FIG. 10 illustrates that the item related to the country code is changed based on the country code after the user selects the use button, but the present disclosure is not limited thereto. For example, when the avatar includes an item related to the country code, and the country code of the user sharing the avatar and the country code of the user receiving the information on the shared avatar are different from each other, among the items included in the shared avatar, the item related to the country code may be changed based on the country code of the user receiving the information on the shared avatar, and the avatar including the changed item may be displayed on the screen for the user to determine whether or not to use the shared avatar. In this case, the change of the item may include not only the replacement with another item, but also deletion of the corresponding item.

Figure 11:
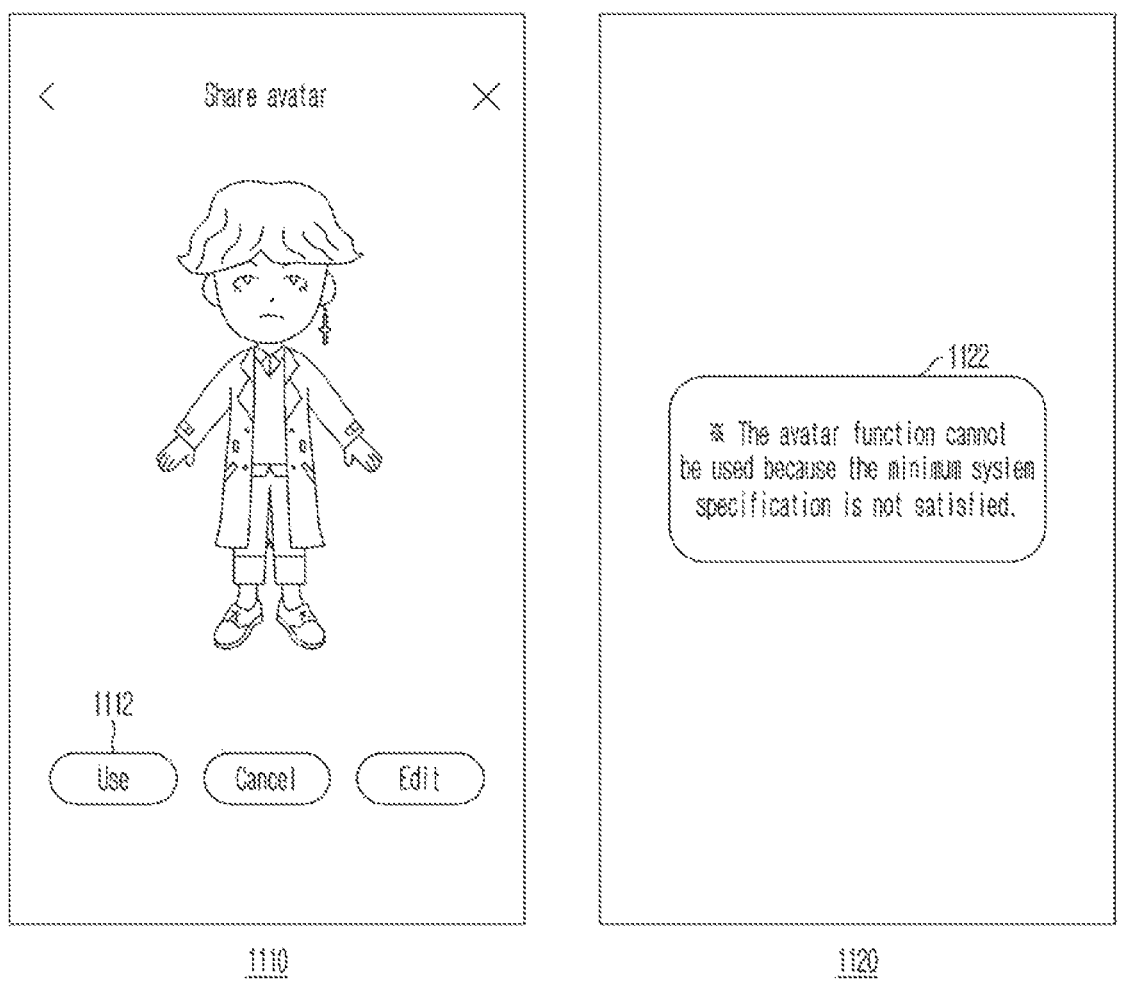
FIG. 11 is a diagram illustrating an example in which a user terminal of a user receiving information on a shared avatar has performance less than a minimum specification, in which case an alarm message is displayed according to an example embodiment.

FIG. 11 is a diagram illustrating an example in which the user terminal of the user receiving the information on the shared avatar has performance less than a minimum specification, in which case an alarm message 1122 is displayed according to an example embodiment. The first operation 1110 indicates that the user selects a use button 1112 through a touch input or the like. In this case, the user terminal may transmit a request to use an avatar including information describing the corresponding terminal (e.g., information related to the performance of the user terminal, which may be referred to as "computer performance" of the user terminal) to the information processing system through the instant messaging application. Examples of the minimum specification and the information related to the performance of the user terminal may include a processor speed, storage/memory space, a response time, and the like.

In response to receiving the request to use an avatar, the information processing system may determine an availability of an avatar function in the user terminal based on the information describing the user terminal included in the request to use an avatar. When it is determined that the avatar function is not available in the user terminal, the information processing system may transmit an alarm message 1122 through the instant messaging application. The second operation 1120 indicates that the user terminal displays the received alarm message 1122 on the screen. For example, the alarm message 1122 may include a message "The avatar function cannot be used because the minimum system specification is not satisfied." Although not illustrated, when it is determined that the avatar function is not available in the user terminal, the information processing system may transmit the image of the shared avatar to the user terminal. In this case, the user terminal may provide the user with a screen for downloading the image of the shared avatar together with, or instead of the alarm message 1122.

Figure 12:
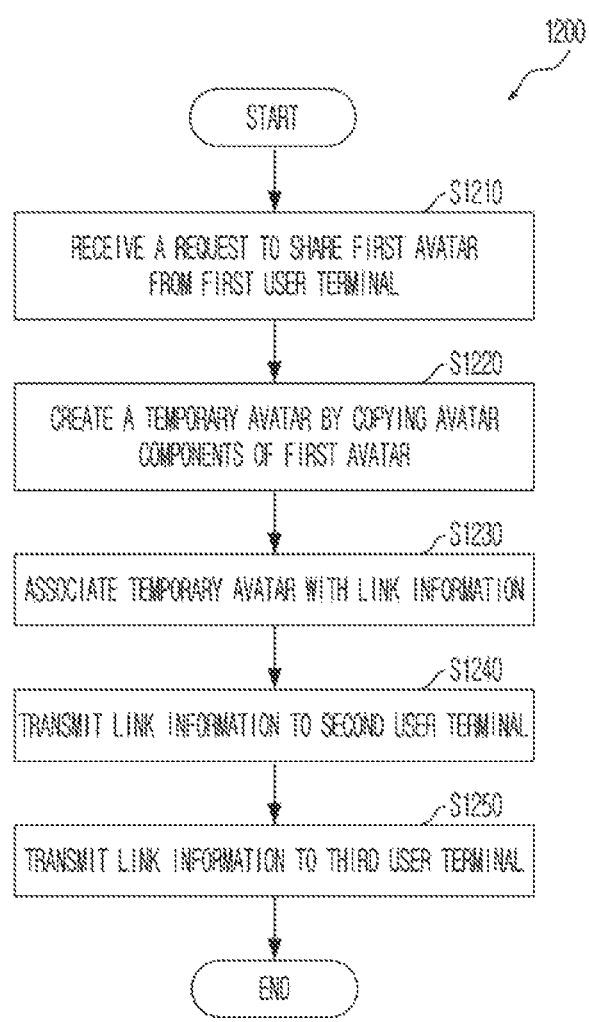
FIG. 12 is a flowchart illustrating a method for sharing avatars according to an example embodiment.

FIG. 12 is a flowchart illustrating a method 1200 for sharing avatars according to an example embodiment. In an embodiment, the method 1200 for sharing avatars may be performed by the information processing system (e.g., by at least one processor of the information processing system). As illustrated, the method 1200 for sharing avatars may be started by receiving a request to share the first avatar from the first user terminal (operation S1210). In an example, the information processing system may receive the request to share from the first user terminal through the instant messaging application running on the first user terminal associated with the first user (or the first user account). The request to share may be a request by the first user to share his or her avatar (e.g., the first avatar) with a single user or a plurality of users (e.g., second and third users).

In an embodiment, the request to share may include information on the user account that allows avatar sharing. In this case, users other than the allowed user are not allowed to access the first avatar even by using the link information. That is, the information processing system may determine whether or not the request to share includes sharing restriction information, and when the sharing restriction information is included, allow access to the first avatar based on the sharing restriction information. In another embodiment, all users having the link information may be allowed to access the first avatar.

In response to receiving the request to share the first avatar, the information processing system may create a temporary avatar for sharing by copying the avatar components of the first avatar (operation S1220). For example, the first avatar of the first user may include a first set of avatar components and be stored in the information processing system. In this case, the information processing system may create a temporary avatar including the first set of avatar components by copying the avatar components of the first avatar.

After creating the temporary avatar, the information processing system may associate the created temporary avatar with the link information (operation S1230). For example, the link information may be Uniform Resource Locator (URL) information indicating a location where the temporary avatar is stored in the database of the information processing system, identification information (e.g., avatar ID) of the temporary avatar, or the like. Thereafter, the information processing system may transmit the created link information to the second and third user terminals which are the terminals the first user wants to share the avatar with (operations S1240 and S1250). In an example, the information processing system may transmit the link information to the second user terminal through the instant messaging application running on the second user terminal associated with the second user (or the second user account), and transmit the link information to the third user terminal through the instant messaging application running on the third user terminal associated with the third user (or third user account).

In an embodiment, when receiving the request to use an avatar from the second user terminal, the information processing system may create a second avatar including the first set of avatar components by copying the first set of avatar components of the temporary avatar. In an example, the information processing system may receive the request to use an avatar from the second user terminal through the instant messaging application running on the second user terminal. Thereafter, the information processing system may associate the created second avatar with the second user account such that the avatar of the second user account may be created. In addition, when receiving the request to modify the second avatar from the second user terminal, the information processing system may update the first set of avatar components of the second avatar to the second set of avatar components based on the request to modify. In this case, since the first avatar of the first user and the second avatar of the second user are stored as independent avatars in the information processing system, the request to modify the second avatar of the second user does not affect the first avatar of the first user.

In an embodiment, when receiving the request to use an avatar from the third user terminal, the information processing system may create a third avatar including the first set of avatar components by copying the first set of avatar components of the temporary avatar. In an example, the information processing system may receive the request to use an avatar from the third user terminal through the instant messaging application running on the third user terminal. Thereafter, the information processing system may associate the created third avatar with the third user account such that the avatar of the third user account may be created. In addition, when receiving the request to modify the third avatar from the third user terminal, the information processing system may update the first set of avatar components of the third avatar to the third set of avatar components based on the request to modify. In this case, since the first avatar of the first user, the second avatar of the second user, and the third avatar of the third user are stored as independent avatars in the information processing system, the request to modify the third avatar of the third user does not affect the first avatar of the first user and the second avatar of the second user.

In an embodiment, the information processing system may delete the temporary avatar for sharing after a predetermined time has elapsed since a point of time it is created. For example, the information processing system may delete the temporary avatar after 14 days elapse since a point of time the temporary avatar for sharing is created. Although it is described above that the user shares his or her avatar with other users, the present disclosure is not limited thereto. For example, sharing only the fashion items worn by the avatar excluding the components for defining the appearance of the avatar can also be performed in a similar manner.

The method for sharing avatars described above may be implemented as a computer-readable code on a computer-readable recording medium. The computer readable recording medium includes all kinds of recording devices in which data readable by a computer system is stored. Examples of computer readable recording medium include ROM, RAM, CD-ROM, magnetic tape, floppy disks, and optical data storage devices, and the like. In addition, the computer readable recording medium may be distributed over network coupled computer systems so that the computer readable code is stored and executed in a distributed manner. Further, programmers in the technical field pertinent to the present disclosure will be easily able to envision functional programs, codes and code segments to implement the embodiments.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer readable medium as one or more instructions or codes, or may be transmitted through a computer readable medium. The computer readable media include both the computer storage media and the communication media including any medium that facilitates the transfer of a computer program from one place to another. The storage media may also be any available media that may be accessed by a computer. By way of non-limiting example, such a computer readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer readable media.

The software module may reside in, RAM memory, flash memory, ROM memory, EPROM memory, EEPROM memory, registers, hard disk, removable disk, CD-ROM, or any other form of storage medium known. For example, a storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

The foregoing embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A method for sharing avatars, the method comprising:
receiving, from a first user terminal associated with a first user account, an avatar share request to share a first avatar of the first user account, with a second user terminal and a third user terminal that are associated with a second user account and a third user account, respectively;
creating a first temporary avatar by copying the first avatar;
storing the first temporary avatar at a first address in a database, in association with a first new avatar identification (ID) and first link information about the first address;
transmitting the first link information to the second user terminal and the third user terminal;
based on a user request for using the first temporary avatar as a second avatar of the second user terminal, being received from the second user terminal, creating the second avatar of the second user account by copying the first temporary avatar and storing the second avatar at a second address in the database, in association with a second new avatar ID;
based on a user request for using the first temporary avatar as a third avatar of the third user terminal, being received from the third user terminal, creating the third avatar of the third user account by copying the first temporary avatar and storing the third avatar at a third address in the database, in association with a third new avatar ID; and
based on a user request for modifying the second avatar, being received from the second user terminal, modifying the second avatar and storing a modified second avatar at a fourth address in the database, in association with the second new avatar ID,
wherein the modified second avatar is different from the first avatar and the third avatar.

2. The method according to claim 1, further comprising:
creating an image file of the first temporary avatar; and
transmitting the image file of the first temporary avatar to the second user terminal.

3. The method according to claim 1, further comprising:
receiving a modification request to modify the third avatar from the third user terminal; and
updating avatar components of the third avatar based on the modification request,
wherein the modification request to modify the third avatar does not affect the first and second avatars.

4. The method according to claim 1, further comprising deleting the first temporary avatar after a predetermined time has elapsed since the first temporary avatar is created.

5. The method according to claim 1, wherein the avatar share request to share the first avatar comprises sharing restriction information for the first avatar, and
the first temporary avatar or the first link information is associated with the sharing restriction information.

6. The method according to claim 5, wherein the avatar share request to share the first avatar comprises item sharing restriction information for at least one item of the first avatar, and the first temporary avatar or the first link information is associated with the sharing restriction information and the item sharing restriction information.

7. The method according to claim 1, further comprising:
based on a first set of avatar components of the first temporary avatar comprising a charged item, creating the second avatar by removing the charged item from the first set of avatar components of the first temporary avatar.

8. The method according to claim 1, further comprising:
based on a first set of avatar components of the first temporary avatar comprising a charged item, creating the second avatar by replacing the charged item from the first set of avatar components of the first temporary avatar with a corresponding free item.

9. The method according to claim 1, further comprising:
based on a first set of avatar components of the first temporary avatar comprising a charged item, transmitting a message recommending purchase of the charged item to the second user terminal.

10. The method according to claim 1, further comprising:
receiving, from the first user terminal, an avatar item share request to share certain items of the first avatar;
creating a second temporary avatar by copying avatar components of the second temporary avatar that are related to the certain items of avatar components of the first avatar;
associating the second temporary avatar with second link information; and
transmitting the second link information to a fourth user terminal.

11. The method according to claim 10, wherein the fourth user terminal is associated with a fourth user account, and the method further comprises:
receiving, from the fourth user terminal, an avatar item use request to use the certain items of the first avatar; and
applying the avatar components of the second temporary avatar to a fourth avatar associated with the fourth user account.

12. The method according to claim 1, wherein the method further comprises:
receiving, from the second user terminal, an avatar item use request to use certain items of the first temporary avatar; and
associating a set of avatar components corresponding to the certain items of the first temporary avatar with the second avatar associated with the second user account.

13. The method according to claim 1, further comprising:
receiving an image from the first user terminal; and
creating the first avatar based on the image.

14. A non-transitory computer-readable storage medium storing program instructions that are executable by at least one processor to perform the method according to claim 1.

15. A method for sharing avatars, the method comprising:
receiving, from a first user terminal associated with a first user account, an avatar share request to share a first avatar of the first user account, with a second user terminal that is associated with a second user account
creating a first temporary avatar by copying the first avatar;
associating the first temporary avatar with first link information;
transmitting the first link information to the second user terminal; and
based on a user request for using and modifying the first temporary avatar as a second avatar of the second user terminal, creating the second avatar of the second user account by copying the first temporary avatar, modifying the copied first temporary avatar, and saving the modified first temporary avatar as the second avatar of the second user account,
wherein the creating the second avatar comprises:
based on a second country code of the second user account being different from a first country code of the first user account, creating the second avatar comprising avatar components in which at least one of avatar components of the first temporary avatar is replaced based on the second country code of the second user account.

16. A method for sharing avatars, the method comprising:
receiving, from a first user terminal, an avatar share request to share a first avatar with a second user terminal, the first avatar comprising a first set of avatar components;
creating a first temporary avatar by copying the first set of avatar components;
receiving, from the second user terminal, a use request to use the first temporary avatar, wherein the use request comprises information about computer performance of the second user terminal;
determining an availability of an avatar function in the second user terminal based on the information about the computer performance of the second user terminal; and
based on determining that the avatar function is not available in the second user terminal, transmitting an alarm message to the second user terminal.

17. A system for sharing avatars, the system comprising:
a communication interface configured to receive, from a first user terminal associated with a first user account, an avatar share request to share a first avatar of the first user account with a second user terminal and a third user terminal that are associated with a second user account and a third user account, respectively;
a memory configured to store one or more computer readable instructions; and
at least one processor configured to execute the computer readable instructions to:
create a first temporary avatar by copying the first avatar;
store the first temporary avatar at a first address in a database, in association with a first new avatar identification (ID) and first link information about the first address;
transmit the first link information to the second user terminal and the third user terminal through the communication interface; and
based on a user request for using the first temporary avatar as a second avatar of the second user terminal, being received from the second user terminal, creating the second avatar of the second user account by copying the first temporary avatar and storing the second avatar at a second address in the database, in association with a second new avatar ID;
based on a user request for using the first temporary avatar as a third avatar of the third user terminal, being received from the third user terminal, creating the third avatar of the third user account by copying the first temporary avatar and storing the third avatar at a third address in the database, in association with a third new avatar ID; and
based on a user request for modifying the second avatar, being received from the second user terminal, modifying the second avatar and storing a modified second avatar at a fourth address in the database, in association with the second new avatar ID, wherein the modified second avatar is different from the first avatar and the third avatar.

\* \* \* \* \*